United States Patent
Hayau et al.

(10) Patent No.: US 10,683,225 B2
(45) Date of Patent: Jun. 16, 2020

(54) SONIC INJECTION FURNACE

(71) Applicants: VERALLIA FRANCE, Courbevoie (FR); SAINT-GOBAIN GLASS FRANCE, Courbevoie (FR)

(72) Inventors: Frédéric Hayau, Suresnes (FR); Laurent Garnier, Saint Martin en Bresse (FR)

(73) Assignees: VERALLIA FRANCE, Courbevoie (FR); SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/579,072

(22) PCT Filed: May 30, 2016

(86) PCT No.: PCT/FR2016/051289
§ 371 (c)(1),
(2) Date: Dec. 1, 2017

(87) PCT Pub. No.: WO2016/193608
PCT Pub. Date: Dec. 8, 2016

(65) Prior Publication Data
US 2018/0170786 A1 Jun. 21, 2018

(30) Foreign Application Priority Data
Jun. 2, 2015 (FR) ................... 15 55009

(51) Int. Cl.
*C03B 5/04* (2006.01)
*C03B 5/235* (2006.01)

(52) U.S. Cl.
CPC ............ *C03B 5/235* (2013.01); *C03B 5/04* (2013.01); *C03B 2211/30* (2013.01); *F23J 2215/101* (2013.01)

(58) Field of Classification Search
CPC . C03B 5/235; C03B 2211/40; C03B 2211/30; C03B 5/04
See application file for complete search history.

(56) References Cited

U.S. PATENT DOCUMENTS 3,248,517 A * 4/1966 Vranken ................. C03B 29/08
219/404
3,881,907 A * 5/1975 Starr ................... C03B 27/0404
65/104

(Continued)

FOREIGN PATENT DOCUMENTS

| EP | 2 508 827 A1 | 10/2012 | |
| WO | WO 2008/078049 A2 | 7/2008 | |
| WO | WO-2012076820 A1 * | 6/2012 | ............. F23D 14/22 |

OTHER PUBLICATIONS

International Preliminary Report on Patentability and the Written Opinion of the International Search Authority as issued in International Patent Application No. PCT/FR2016/051289, dated Dec. 5, 2017.

(Continued)

*Primary Examiner* — John H Hoffmann
(74) *Attorney, Agent, or Firm* — Pillsbury Winthrop Shaw Pittman LLP

(57) ABSTRACT

A low-NOx end-fired furnace for melting glass equipped with an overhead burner includes an inlet duct for oxidizer, including 15% to 30% of oxygen, in its upstream wall, a duct for receiving the combustion flue gases in its upstream wall, and a sonic injection system including at least one injector for injecting a jet of a gas at a speed at least equal to 80% of the speed of sound, referred to as a sonic injector, opening into the upstream wall or opening into the duct for receiving the combustion flue gases, the sonic injector injecting its gas (Continued)

Figure 4:
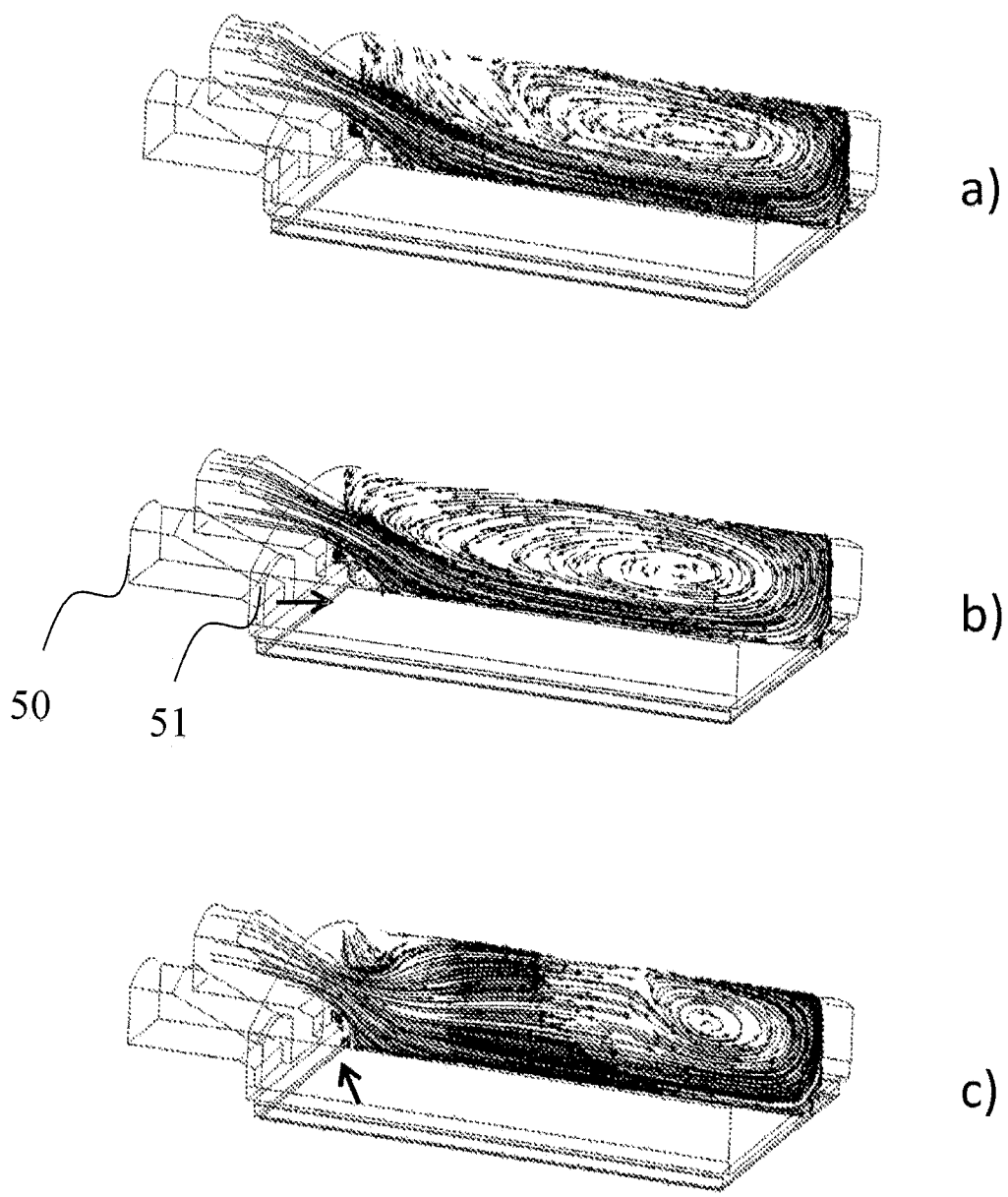

counter-current to the stream of the combustion flue gases that are heading toward the duct for receiving the combustion flue gases.

15 Claims, 2 Drawing Sheets

(56) References Cited

U.S. PATENT DOCUMENTS

| | | | |
|---|---|---|---|
| 4,347,072 A | 8/1982 | Nagaoka et al. | |
| 4,372,770 A | 2/1983 | Krumwiede et al. | |
| 4,622,007 A * | 11/1986 | Gitman | B05B 7/0861 239/419.3 |
| 4,988,285 A * | 1/1991 | Delano | F23C 7/00 431/10 |
| 5,203,859 A | 4/1993 | Khinkis et al. | |
| 5,993,203 A * | 11/1999 | Koppang | C03B 5/235 432/179 |
| 6,007,326 A * | 12/1999 | Ryan, III | F23C 7/02 110/261 |
| 6,705,117 B2 * | 3/2004 | Simpson | C03B 5/193 431/10 |
| 8,806,897 B2 * | 8/2014 | Watson | C03B 5/235 65/135.9 |
| 2009/0004611 A1 * | 1/2009 | Kobayashi | C03B 5/2353 431/10 |
| 2011/0232333 A1 * | 9/2011 | Hansen | C03B 3/026 65/469 |

OTHER PUBLICATIONS

International Search Report as issued in International Patent Application No. PCT/FR2016/051289, dated Sep. 2, 2016.

* cited by examiner

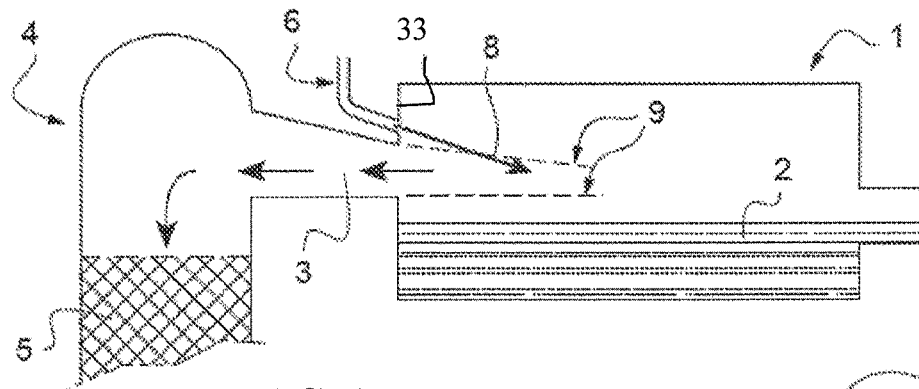
FIG. 1
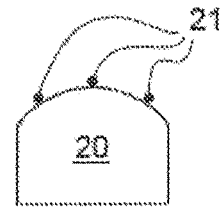
FIG. 2a
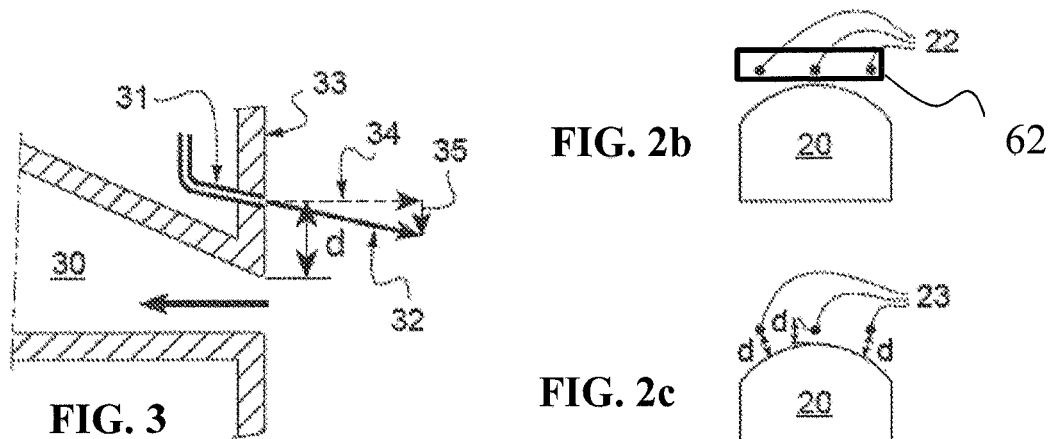
FIG. 2b
FIG. 3
FIG. 2c
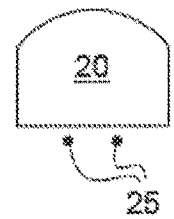
FIG. 2d
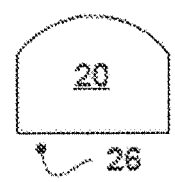
FIG. 2e

SONIC INJECTION FURNACE

CROSS-REFERENCE TO RELATED APPLICATIONS

This application is the U.S. National Stage of PCT/FR2016/051289, filed May 30, 2016, which in turn claims priority to French patent application number 1555009 filed Jun. 2, 2015. The content of these applications are incorporated herein by reference in their entireties.

The invention relates the field of low-NOx end-fired furnaces for melting glass.

A person skilled in the art generally denotes NOx as being the emissions of nitrogen oxide of NO and/or $NO_2$ type originating from the undesired oxidation of nitrogen. A significant source of nitrogen is that contained in the oxidizer such as air or oxygen-enriched air.

Most combustion processes, in particular those used in glassmaking furnaces, are faced with problems of undesired emission of NOx in the combustion flue gases. NOx has a harmful effect both on humans and on the environment. Specifically, on the one hand, $NO_2$ is an irritant gas that causes respiratory diseases. On the other hand, in contact with the atmosphere, it may gradually form acid rain. Finally, it leads to photochemical pollution since, in combination with volatile organic compounds and solar radiation, it is behind the formation of "tropospheric" ozone, the increase in the concentration of which at low altitude becomes harmful to humans, especially in periods of intense heat. This is why the standards on the emission of NOx are becoming increasingly stringent. Due to the very existence of these standards, manufacturers and operators of furnaces such as manufacturers and operators of glass furnaces are constantly concerned with limiting NOx emissions as much as possible, preferably to a content below 800 mg/$Nm^3$, standardized at 8% oxygen in dry flue gas. Within the context of the present application, the NOx contents are always expressed in mg/$Nm^3$, standardized at 8% oxygen in dry flue gas, the unit customarily used by a person skilled in the art. A person skilled in the art generally considers that a NOx content below 700 mg/$Nm^3$ is already a good content and that a NOx content below 600 mg/$Nm^3$ is very good. It is useful to know how to obtain even lower NOx contents.

Glass melting furnaces are designed to operate for several tens of years and their construction is expensive. This is why their design changes slowly. Indeed, carrying out tests in industrial furnaces is made virtually impossible because the risk taking is so high if operating parameters such as device dimensions are changed. In particular, the air inlets opening into the walls of the furnace are ducts made of refractory ceramic, the dimensions of which cannot be easily modified without having to shut down the furnace in order to reconstruct a good portion thereof. This is why it is not possible to easily modify the design of the furnace in order to modify the flows within the combustion chamber and in particular the impulse of the air without changing its flow rate.

The impulse I of a gas jet delivered by an injector is given by the formula:

$$I = Q_m \cdot V + S \cdot \Delta P$$

in which:
  $Q_m$ represents the mass flow rate of the gas jet;
  V represents the velocity of the gas at the outlet of the injector;
  S represents the cross-sectional area of the injector at its outlet;
  $\Delta P$ represents the pressure difference between the outlet of the injector and the pressure in the chamber.

The term "sonic" describing a gas jet means that said jet has the speed of sound at the temperature of the gas injected (temperature at the outlet of the injector).

EP 2 508 827 A1 teaches the injection of an oxidizing gas into a sidewall of an end-fired furnace in order to terminate the combustion of the fuel, according to the principle of staged combustion. This injection is carried out diagonally both in the direction of the upstream wall and the direction of the opposite wall and therefore somewhat in the same direction as the stream of the combustion flue gases. The recirculation of the gases is greatly intensified thereby, which would be supposed to reduce the concentration of NOx, without however precise exemplary embodiments being given. This document teaches that it is difficult to drop below 1100 mg/$Nm^3$ of NOx and proposes a solution for dropping the NOx content below this value. The inventors of the present invention have been able to determine that the horizontal recirculation in the laboratory of the furnace is actually increased. However, the vertical recirculation is also reduced. The flame is not greatly spread out when seen from above parallel to the surface of the glass. The development of the flame is then confined and restricted in a zone close to the side wall opposite the one containing the gas injector. This movement of the flame toward the concentrated state close to the side wall gives rise to an increase in the temperature of the side wall, which is highly unfavorable to its performance over time. Furthermore, the dilution of the flame is partial and in fact not very effective. Indeed, these strong recirculations interact little with the flame, which is not very effective in terms of reduction of NOx. The inventors of the present invention have been able to determine that this solution was not very effective for dropping the NOx content of a furnace which is already at less than 700 mg/$Nm^3$ without any additional injection of gas.

According to the invention, a simple means has now been found for influencing the flame combustion by acting on the gas flows within the combustion chamber and without having to engage in sizeable disassemblies of refractory material forming the walls of a furnace and in particular the air inlets. Specifically, at least one compressed gas injector has simply been placed in sonic or supersonic or quasi-sonic regime (quasi-sonic means at least 80% of the speed of sound), this injector being referred to as a "sonic injector", in the vicinity of the duct for receiving the flue gases or in the duct for receiving the flue gases and counter-current to the stream of the flue gases. The great advantage provided by this sonic injector for reducing the NOx content was then realized. Within the context of the present application, a sonic injector delivers its gas at a speed of at least 80% and preferably of at least 95% of the speed of sound. Generally, this speed does not exceed 300% of the speed of sound. The shape of the end of the sonic injector makes it possible to exceed the speed of sound or not. In order to exceed it, it is advisable to use an injector with convergent then divergent shape. The injectors customarily used in the glass field have a convergent end. This configuration makes it possible to achieve the speed of sound without being able to exceed it.

The invention relates to an end-fired furnace for melting glass equipped with an overhead burner comprising an inlet duct for oxidizer, comprising 15% to 30% of oxygen, in its upstream wall, a duct for receiving the combustion flue gases in its upstream wall, and a sonic injection system comprising at least one injector for injecting a jet of a gas at a speed at least equal to 80% of the speed of sound, referred to as a sonic injector, opening into the upstream wall or opening into the duct for receiving the combustion flue gases, said sonic injector injecting its gas counter-current to the stream of the combustion flue gases that are heading toward the duct for receiving the combustion flue gases.

The invention makes it possible to obtain excellent NOx contents in the flue gases since they are able to be less than 600 and even less than 570 mg/Nm$^3$ and even less than 500 mg/Nm$^3$, or even less than 450 mg/Nm$^3$. The injection of the sonic gas counter-current to the combustion flue gases favors the vertical recirculation of the combustion gases above the flame. Indeed, the numerical simulation of the gas flows in the laboratory volume showed that the injection of sonic gas according to the invention inhibited the horizontal recirculation in order to favor the vertical recirculation above the flame. This is favorable for the spreading of the flame over the surface of the glass and therefore for the transfer of heat to the glass and also for the increase in the exchange area between the flame and the combustion gases. Consequently, the dilution of the flame in the combustion gases is increased and the concentration of NOx is decreased.

The sonic injection system may comprise only a single sonic injector (injector for injecting a jet of a gas at a speed at least equal to 80% of the speed of sound) or a plurality of sonic injectors, that is to say 2 or 3 or 4 or 5 or 6 or even more sonic injectors.

The oxidizer is generally air. The oxidizer inlet duct supplies most of the oxidizer, that is to say at least 95% of the total oxidizer flow rate entering the combustion chamber, the remainder being induced air. This oxidizer inlet duct is formed by an opening in a wall made of refractory material.

It appears that the jet of compressed gas sent by the sonic injector into the combustion flue gas helps to substantially modify the path and the recirculation of the gas streams in the furnace. The flame thus produced in the furnace is more diluted, the heat that it provides is thus distributed over a greater length and the residence times of the flue gases in the combustion chamber are on the whole increased. This is favorable in two respects:

a) less NOx is formed due to the lower flame temperature,
b) the refractory materials of the furnace are less thermally stressed and therefore see their service life increased.

The sonic injector opens into the wall comprising the duct for receiving the combustion flue gases or opens into the duct for receiving the combustion flue gases and injects the sonic gas counter-current to the stream of the combustion flue gases that are heading (in the combustion chamber) toward the upstream wall. The terms "upstream" and "downstream" refer to the flow direction of the glass that runs from upstream to downstream. In an end-fired furnace, the flame starts from one burner (that is to say the assembly formed by the oxidizer inlet duct and the fuel injector(s)) of the upstream wall in order to go toward downstream, then turns in order to come back toward the duct for receiving the combustion flue gases also located in the upstream wall and next to the oxidizer inlet duct. According to the invention, the sonic injector injects its gas in the direction from upstream toward downstream, but counter-current to the combustion flue gases, that is to say by encountering the stream of flue gases when this stream is heading toward the duct for receiving the flue gases in the upstream wall, and in the opposite direction to that of the stream of flue gases. In order to do this, preferably, every sonic injector of the sonic injection system opens into the duct for receiving the flue gases or into the upstream wall at a point closer to the duct for receiving the flue gases than to the oxidizer inlet duct. Preferably, every sonic injector of the sonic injection system opens at less than 1 m or even less than 0.5 m from the edge of the duct for receiving the flue gases. This is valid for the case where the sonic injector opens into the duct for receiving the flue gases or into the upstream wall. The edge of the duct for receiving the flue gases is the contour formed by the duct for receiving the flue gases in the wall comprising said duct, that is to say the upstream wall, on the side of the combustion chamber. Even if, where appropriate, the sonic injector opens inside the duct for receiving the flue gases, it is powerful enough to perturb the flow of the stream of flue gases still in the furnace and heading toward the duct for receiving the flue gases. This is why, when it is said that the sonic gas injects its gas counter-current to the stream of the combustion flue gases that are heading toward the upstream wall, it is the stream of the flue gases still in the furnace and that are going to enter the duct for receiving the flue gases.

The vector representing the speed of the gas at the outlet of a sonic injector has a non-zero component parallel to the stream of the flue gases entering the duct for receiving the flue gases and in the opposite direction to the direction of this stream. It may be considered that the stream of the flue gases entering the duct for receiving the flue gases has a direction substantially perpendicular to the upstream wall of the furnace comprising the duct for receiving the flue gases. Preferably, the impulse component of the sonic injection system perpendicular to the wall comprising the duct for receiving the combustion flue gases is greater than 5 newtons and preferably greater than 10 newtons. According to the latter feature, all the sonic injectors of the sonic injection system are taken into account and the overall component of the system is determined perpendicular to the upstream wall. This component is the result of all the impulse components ejected by all the sonic injectors perpendicular to the wall comprising the duct for receiving the combustion flue gases. This component is greater than 5 newtons and preferably greater than 10 newtons.

The compressed gas injected by the sonic injector may be of any nature and may in particular be natural gas or oxygen but is preferably air.

End-fired furnaces are well known to those skilled in the art of glass melting. The upstream wall of an end-fired furnace comprises two openings that operate alternately as oxidizer inlet duct and as duct for receiving the flue gases. For the operation of an end-fired furnace, reference may in particular be made to WO 2008/078049 and in particular its FIGS. 1 and 2. Thus, in order to operate the present invention, each of these two openings is provided with a sonic injection system but only the one associated with the opening that operates as duct for receiving the flue gases is operated. When the operation of the furnace is reversed, the operation of these two sonic injection systems is also reversed. Therefore, the one associated with the opening that has become the oxidizer inlet duct is shut down and the one associated with the opening that has become the duct for receiving the flue gases is started up.

The oxidizer inlet duct opens into the combustion chamber of the furnace via an opening in the upstream wall of the furnace made of refractory material. The crown of this duct generally drops in the circulation direction of the oxidizer in order to form an angle with the horizontal of between 14° and 30°. Thus, the oxidizer is guided toward the fuel stream since the latter is generally injected by injectors located below the oxidizer inlet duct. These fuel injectors may be oriented so that their jets are slightly pointed upward in the direction of the oxidizer stream. The fuel emission direction may generally form an angle with the horizontal of between 0 and 15°, in particular between 3° and 15° upward. The oxidizer inlet duct and its fuel injector(s) constitute a burner. Generally, several fuel injectors are used and are placed under the air stream. These fuel injectors are distributed under the air stream, one next to the other when seen from above, so as to spread the flame, when seen from above, parallel to the surface of the glass. A regenerator is generally placed behind each of the two openings of the upstream wall of the furnace. The oxidizer passes through a regenerator and is reheated by it before arriving at the oxidizer inlet duct. When the "reversal" of the furnace is carried out, the oxidizer inlet duct becomes the duct for receiving the flue gases and the regenerator associated with said duct is then reheated by the flue gases. The regenerators are filled with refractory elements (bricks, cruciforms, etc.) forming a network traveled through by the flue gases or the oxidizer depending on the operating phase. When the regenerator is passed through by the flue gas, the heat of the flue gas is transmitted to the refractory elements of the regenerator. When the regenerator is passed through by the oxidizer, the heat of the refractory elements of the regenerator heats the oxidizer. The oxidizer in the oxidizer inlet duct is substantially at atmospheric pressure and generally at a pressure slightly above atmospheric pressure, i.e. a pressure between atmospheric pressure and atmospheric pressure+100 Pa, as absolute pressure.

Thus, in the end-fired furnace according to the invention, the cross-sectional area of the oxidizer inlet duct in the upstream wall is generally within the range extending from 0.5 to 3 m$^2$. The duct for receiving the flue gases is generally identical to the oxidizer inlet duct since each of these ducts alternately plays the part of providing oxidizer and of receiving the flue gases. Thus, the cross-sectional area of the duct for receiving the flue gases in the upstream wall is generally within the range extending from 0.5 to 3 m$^2$.

One or more sonic injectors, in particular two or three or four or five or six sonic injectors or even more, may equip a duct for receiving the flue gases by forming a sonic injection system according to the invention. A sonic injector may be formed by a tube made of refractory metal, in particular made of stainless steel, inserted into an orifice made in the refractory material of the duct for receiving the flue gases or surrounding the duct for receiving the flue gases.

A sonic injector may open into the furnace above or below or on the sides of the duct for receiving flue gases or in the duct for receiving flue gases itself. Preferably, the axis of the sonic injector is pointed toward the stream of flue gases heading toward the upstream wall and counter-current to this stream.

The discharge area of the sonic injection system preferably has a total area within the range extending from 0.2 to 4 cm$^2$. For the case where a single sonic injector is used, it is the area at the end of the sonic injector. For the case where the sonic injection system comprises several sonic injectors, it is the sum of the areas for discharging the gas through all the sonic injectors.

The sonic system delivers gas in a proportion of from 0.2% to 5% and preferably from 0.2% to 2% of the Normal volume of oxidizer introduced by the oxidizer inlet duct. Therefore, the sum of the volumes of gas delivered by all the injectors of the sonic injection system is taken here.

The invention also relates to a process for preparing molten glass comprising the melting of glass in the end-fired furnace according to the invention. In particular, the amount of oxidizer introduced into the furnace is preferably in excess relative to the amount of fuel introduced into the furnace. In particular, the amount of oxidizer introduced into the furnace not including via the sonic injection system is preferably in excess relative to the amount of fuel introduced into the furnace not including via the sonic injection system.

The figures are not to scale.

FIG. 1 represents an end-fired furnace according to the invention seen from the side in cross section.

FIGS. 2a-e show various sonic injection systems that can be combined with a duct for receiving the flue gases in a furnace according to the invention.

FIG. 3 represents, as a cross-sectional side view, a duct for receiving the flue gases equipped with a sonic injector opening into the same upstream wall of the furnace according to the invention.

FIG. 4 is a representation of the gas flows in an end-fired furnace according to various configurations. FIG. 1 represents an end-fired furnace 1 seen from the side in cross section, the molten glass 2 flowing from left to right. The cross section is made through the duct 3 for receiving the flue gases, which are sent into the regenerator 4 containing refractory elements 5 that the flue gases will reheat. After phase inversion, this opening will be used as burner oxidizer inlet duct for a flame, said oxidizer then being reheated by the refractory elements 5. As represented, the duct is in the flue gas receiving phase. A compressed gas injector 6 opens into the upstream wall 33 which is also the wall into which the duct for receiving the flue gases opens. The jet 8 of compressed gas is sent toward the stream of flue gases (depicted by the dotted lines 9), heading toward the duct for receiving the flue gases, while being counter-current thereto.

FIG. 2 shows various sonic injection systems that may be combined with a duct for receiving the flue gases. These various configurations are illustrated by the examples. The sonic injection system may comprise 3 injectors 21 and may be located just above the duct for receiving the flue gases 20 (FIG. 2a) or at a certain distance above the flue gases (FIG. 2b). The injectors of the sonic injection system may be located beneath the duct for receiving the flue gases (FIG. 2d). In FIG. 2e, a single injector 26 is used and is located beneath the duct for receiving the flue gases 20. Here the injector is slightly to the left, to the side of the longitudinal axis of the furnace. In FIG. 2c, sonic injectors 23, 24 have been combined in the sonic injection system above 23 and below 24 the duct for receiving the flue gases. The term "d" denotes what is understood by the distance between the injector and the edge of the duct. Considering the small diameter of the sonic injector, the distance d is taken starting from its axis.

FIG. 3 represents a duct 30 for receiving the flue gases, seen from the side, equipped with a sonic injector (31) opening into the same upstream wall 33 of the furnace. The sonic injector is at the distance d from the edge of the duct. The sonic injector delivers its gas with an impulse represented by the vector 32, which may be broken down into a component 34 perpendicular to the upstream wall 33 and another component 35 parallel to the wall.

FIG. 4 is a representation of the gas flows in a reference end-fired furnace without additional injection of gas through a wall (configuration a), in an end-fired furnace with sonic injection according to the invention (configuration b), and in an end-fired furnace with sonic injection in a side wall (configuration c). The configuration b) of FIG. 4 shows the overhead burner 50 and the inlet duct for oxidizer 51.

EXAMPLES 1 TO 10

The tests were carried out with an end-fired furnace comprising two burners operating in inversion, having a power of 13.3 megawatts and the oxidizer of which was air. Each air inlet duct had an area of 1.55 m² (2200 mm wide and 800 mm high). The furnace was supplied with soda-lime type batch material, including 95% by weight of cullet. It operated with an output of 330 tonnes per day. The furnace had a surface area of 94 m². The temperature of the glass at the outlet of the furnace was around 1300° C. The crown was at a temperature of around 1600° C.

One or more sonic compressed air injectors were placed in the vicinity of the duct for receiving the combustion flue gases in order to form sonic injection systems. These injectors had a convergent end. The gas injected was at 25° C. Table 1 gives the various operating conditions and also the results in terms of content of NOx in the flue gases. Four possible sonic injector positions were tested:
- just above the flue gas receiver: the injector is exactly at the edge of the duct for receiving the flue gases with a downward angle of 20° with respect to the horizontal;
- slightly above the duct for receiving the flue gases: the injector is 400 mm above the upper edge of the duct for receiving the flue gases with a downward angle of 20° with respect to the horizontal;
- below the duct for receiving the flue gases: the injector is 250 mm below the duct for receiving the flue gases with an upward angle of 5° with respect to the horizontal.

All the sonic compressed air injectors above the duct for receiving the flue gases had an internal diameter of 5 mm. The sonic compressed air injectors underneath the duct for receiving the flue gases had an internal diameter of 6 mm.

Indicated in table 1 are:
- the relative pressure: this is the pressure of the reservoir supplying the sonic injector;
- the flow rate: this is the total flow rate of compressed air (sum of the flow rates of all the sonic injectors);
- the injection speed: this is the speed of the air at the outlet of the sonic compressed air injector;
- sonic impulse: this is the sum of the impulses of the sonic injectors (in the case of example 2, no injection is sonic but the impulse of the gas has nevertheless been depicted at 50% of the speed of sound in the "sonic impulse" column for the sake of simplification);
- NOx: this is the concentration in mg/Nm³ standardized at 8% oxygen in dry flue gas;
- variation: this is the variation in NOx relative to a reference (without sonic injection of compressed air).

The "variation" results from examples 2 to 7 are given relative to example 1. The "variation" results of examples 9 to 10 are given relative to example 8.

EXAMPLES 11 AND 12

The tests were carried out with an end-fired furnace comprising two burners operating in inversion, having a power of 11 megawatts and the oxidizer of which was air. Each burner air inlet duct (or duct for receiving the flue gases, depending on the inversion phase) had an area of 2 m² (2300 mm wide and 960 mm high). The furnace was supplied with soda-lime type batch material, including 60% by weight of cullet. It operated with an output of 250 tonnes per day. The furnace had a surface area of 85 m². The temperature of the glass at the outlet of the furnace was around 1300° C. The crown was at a temperature of around 1600° C. The sonic injection system comprised only a single sonic compressed air injector with a convergent end. The latter was placed 300 mm below the duct for receiving the flue gases and at 650 mm from the lower corner of the duct for receiving the flue gases closest to the longitudinal axis of the furnace. The sonic injector injected its gas with an upward angle of 5° with respect to the horizontal and had an internal diameter of 8 mm in diameter. The gas injected was at 25° C.

Table 1 gives the various operating conditions and also the results in terms of content of NOx in the flue gases.

TABLE 1

| Ex. No. | Number of injectors just above | Number of injectors 400 mm above | Number of injectors 250 mm below | Relative pressure [bar] | Flow rate [Nm³/h] | % Speed of sound | Injection speed [m/s] | Sonic impulse [N] | NOx [mg/Nm³ @ 8% O₂] | Variation |
|---|---|---|---|---|---|---|---|---|---|---|
| 1 (comp) | | | | | | | | | 601 | — |
| 2 (comp) | 3 | | | 0.2 | 35 | 50 | 174 | 2 | 607 | 1% |
| 3 | 3 | | | 0.7 | 65 | 84 | 289 | 7 | 559 | −7% |
| 4 | 3 | | | 1.7 | 104 | 100 | 346 | 14 | 546 | −9% |
| 5 | 3 | | | 4.2 | 200 | 100 | 346 | 33 | 405 | −33% |
| 6 | 0 | 3 | | 4.2 | 200 | 100 | 346 | 33 | 390 | −35% |
| 7 | | | 2 | 4.2 | 200 | 100 | 346 | 33 | 397 | −34% |
| 8 (comp) | | | | — | — | — | — | — | 778 | — |
| 9 | 3 | | | 4.2 | 200 | 100 | 346 | 33 | 494 | −37% |
| 10 | | 3 | 2 | 4.2 | 400 | 100 | 346 | 65 | 354 | −54% |
| 11 | | | 1 | 3 | 132 | 100 | 346 | 21 | 457 | |
| 12 | | | 1 | 3.5 | 148 | 100 | 346 | 24 | 381 | |

EXAMPLES 13 TO 15

Numerical simulations were carried out of the flow of the combustion flue gases in an end-fired furnace in operation, in the following configurations:
a) reference: no additional injection of gas (see FIG. 4a));
b) additional injection of 181 Nm³/h of sonic gas in the upstream wall in accordance with the present invention;

c) additional injection of 150 Nm³/h of sonic gas in the side wall (see FIG. 4b, the additional injection being symbolized by a bold arrow); the injector formed an angle of 60° with the side wall of the upstream wall side and was at a distance from the upstream wall equal to 23% of the total length of the side wall; this example is given by way of comparison and is not according to the present invention;

d) additional injection of 150 Nm³/h of sonic gas in the upstream wall (see FIG. 4c, the additional injection being symbolized by a bold arrow) in accordance with the present invention.

The end-fired furnace comprises two burners operating in inversion, having a power of 11 megawatts, and the oxidizer of which is air. Each burner air inlet duct (or duct for receiving the flue gases, depending on the inversion phase) has an area of 1.55 m² (2200 mm wide and 800 mm high). The furnace has a surface area of 94 m². The temperature of the glass at the outlet of the furnace was around 1300° C. The sonic gas injected was at 25° C.

FIG. 4 shows the effect of these injections on the gas flows in the laboratory volume of the furnace. In order to visualize these flows, the speed vectors have been shown in a vertical plane passing through the middle of the air inlet duct. This representation makes it possible to visualize the vertical recirculation of the gases. Large differences are observed depending on the configurations. It is seen that the sonic injection according to the invention leads to the broadest recirculation in the laboratory volume. Furthermore, the results on the NOx expressed relative to a reference without sonic injection demonstrate the superiority of the injection according to invention, as shown by table 2. The "variation" column gives the concentration of NOx relative to the reference configuration without additional gas injection (FIG. 4a). The injection according to invention leads to a reduction, respectively, of 15% and 20% in NOx. The injection of sonic gas in the side wall does not produce a substantial reduction in NOx.

2. The process as claimed in claim 1, wherein the sonic system delivers gas in a proportion of from 0.2% to 5% of a Normal volume of oxidizer introduced by the oxidizer inlet duct.

3. The process as claimed in claim 2, wherein the sonic system delivers gas in a proportion of from 0.2% to 2% of the Normal volume of oxidizer introduced by the oxidizer inlet duct.

4. The process as claimed in claim 1, wherein an amount of oxidizer introduced into the furnace is in excess relative to an amount of fuel introduced into the furnace.

5. The process as claimed in claim 1, wherein an amount of oxidizer introduced into the furnace not including via the sonic injection system is in excess relative to an amount of fuel introduced into the furnace not including via the sonic injection system.

6. The process as claimed in claim 1, wherein the speed of the jet of gas is at least 95% of the speed of sound.

7. The process as claimed in claim 1, wherein an impulse component of the sonic injection system perpendicular to the wall comprising the duct for receiving the combustion flue gases is greater than 5 newtons.

8. The process as claimed in claim 7, wherein the impulse component of the sonic injection system perpendicular to the wall comprising the duct for receiving the combustion flue gases is greater than 10 newtons.

9. The process as claimed in claim 1, wherein the gas of the jet of gas is air.

10. The process as claimed in claim 1, wherein a cross-sectional area of the oxidizer inlet duct in the upstream wall is within the range extending from 0.5 to 3 m² and wherein a cross-sectional area of the duct for receiving the combustion flue gases in the upstream wall is within the range extending from 0.5 to 3 m².

11. The process as claimed in claim 1, wherein a discharge area of the sonic injection system is within the range extending from 0.2 to 4 cm².

TABLE 2

| Ex. No. | Number of injectors in side wall | Number of injectors 250 mm below the duct for receiving the flue gases | Flow rate [Nm³/h] | % Speed of sound | Injection speed [m/s] | Sonic impulse [N] | Variation (%) |
|---|---|---|---|---|---|---|---|
| 13 (FIG. 4b) | | 2 | 181 | 100 | 346 | 27 | −19% |
| 14 (comp) (FIG. 4c) | 1 | | 150 | 94 | 326 | 17 | −1% |
| 15 | | 1 | 150 | 94 | 326 | 17 | −15% |

The invention claimed is:

1. A process for preparing molten glass comprising:
melting glass in an end-fired furnace, the end-fired furnace equipped with (i) an overhead burner comprising an inlet duct for oxidizer, comprising 15% to 30% of oxygen, in an upstream wall of the end-fired furnace, (ii) a duct for receiving combustion flue gases, the duct opening into the upstream wall, and (iii) a sonic injection system comprising at least one sonic injector opening into the upstream wall or opening into the duct for receiving the combustion flue gases, and
injecting by said at least one injector a jet of a gas at a speed at least equal to 80% of the speed of sound, said at least one sonic injector injecting the jet of gas so that the jet of gas is counter-current to a stream of the combustion flue gases that are heading toward the duct for receiving the combustion flue gases.

12. The process as claimed in claim 1, wherein every sonic injector of the sonic injection system opens into the duct for receiving the combustion flue gases or into the upstream wall at a point closer to the duct for receiving the combustion flue gases than to the oxidizer inlet duct.

13. The process as claimed in claim 1, wherein every sonic injector of the sonic injection system opens at less than 1 m from an edge of the duct for receiving the combustion flue gases.

14. The process as claimed in claim 13, wherein every sonic injector opens at less than 0.5 m from the edge of the duct for receiving the combustion flue gases.

15. The process as claimed in claim 1, wherein the sonic injection system comprises a plurality of sonic injectors.

* * * * *